(12) United States Patent
Tesar et al.

(10) Patent No.: US 7,054,076 B2
(45) Date of Patent: May 30, 2006

(54) LENS ASSEMBLY AND OPTICAL IMAGING SYSTEM USING SAME

(75) Inventors: John Tesar, Tucson, AZ (US); Robert Lee Thompson, Rogers, AR (US)

(73) Assignee: Pinotage, L.L.C., Fayetteville, AR (US)

( * ) Notice: Subject to any disclaimer, the term of this patent is extended or adjusted under 35 U.S.C. 154(b) by 0 days.

(21) Appl. No.: 10/798,841

(22) Filed: Mar. 11, 2004

(65) Prior Publication Data

US 2005/0200977 A1    Sep. 15, 2005

(51) Int. Cl.
*G02B 9/62* (2006.01)

(52) U.S. Cl. ........................ 359/726; 359/760
(58) Field of Classification Search ................ 359/760, 359/759, 757, 752, 740, 754, 756, 776
See application file for complete search history.

(56) References Cited

U.S. PATENT DOCUMENTS

| | | | |
|---|---|---|---|
| 2,117,252 A | 5/1938 | Lee | |
| 2,701,982 A | 2/1955 | Angenieux | |
| 2,807,983 A * | 10/1957 | Tronnier | 359/740 |
| 2,894,431 A * | 7/1959 | Miles | 359/765 |
| 3,504,961 A * | 4/1970 | Hoogland et al. | 359/754 |
| 3,560,079 A | 2/1971 | Wakimoto et al. | |
| 3,634,001 A | 1/1972 | Shimada | |
| 3,840,290 A | 10/1974 | Betensky et al. | |
| 4,009,943 A | 3/1977 | Horimoto | |
| 4,111,529 A | 9/1978 | Yamashita | |
| 4,291,952 A | 9/1981 | Takase et al. | |
| 4,319,809 A | 3/1982 | Abel | |
| 4,621,284 A | 11/1986 | Nishioka et al. | |
| 4,644,845 A | 2/1987 | Garehime, Jr. | |
| 4,674,844 A | 6/1987 | Nishioka et al. | |
| 4,697,210 A | 9/1987 | Toyota et al. | |
| 4,745,471 A | 5/1988 | Takamura et al. | |
| 4,807,025 A | 2/1989 | Eino et al. | |
| 4,809,680 A | 3/1989 | Yabe | |
| 4,816,828 A | 3/1989 | Feher | |

(Continued)

FOREIGN PATENT DOCUMENTS

DE    196 33 286 A    2/1998

(Continued)

OTHER PUBLICATIONS

International Search Report PCT/US2005/008260 dated Dec. 23, 2005.

*Primary Examiner*—Alicia M Harrington
(74) *Attorney, Agent, or Firm*—Wolf Greenfield & Sacks, P.C.

(57) ABSTRACT

A lens assembly is constructed to accommodate certain, often competing, design characteristics. The lens assembly provides high optical performance in a compact and easy to manufacture system. The lens assembly allows a manufacturer to produce a system that is common among various aperture sizes so that manufacturability is enhanced. The lens assembly is also suitable for use in connection with additional components, such as filters and/or electronic detectors, such as CCD's and/or CMOS's. The lens assembly may be arranged to provide a relatively wide angle, such as approximately 40 degrees, with minimal distortion, for example, less than 1%. a ratio of the length of the lens assembly to the back focal length of approximately 1.39 to accommodate additional components, such as optical filters. The lens assembly may be configured as a four group, six element, lens assembly. The lens assembly may contain compensating aberrations to compensate the aberrations of plane parallel plates that may be used in connection with the lens assembly.

46 Claims, 8 Drawing Sheets

U.S. PATENT DOCUMENTS

| | | |
|---|---|---|
| 4,831,456 A | 5/1989 | Takamura |
| 4,832,003 A | 5/1989 | Yabe |
| 4,855,838 A | 8/1989 | Jones et al. |
| 4,858,002 A | 8/1989 | Zobel |
| 4,867,137 A | 9/1989 | Takahashi |
| 4,868,647 A | 9/1989 | Uehara et al. |
| 4,870,488 A | 9/1989 | Ikuno et al. |
| 4,878,112 A | 10/1989 | Ieoka |
| 4,878,113 A | 10/1989 | Nakamura |
| 4,888,639 A | 12/1989 | Yabe et al. |
| 4,890,159 A | 12/1989 | Ogiu |
| 4,971,035 A | 11/1990 | Ito |
| 4,989,586 A | 2/1991 | Furukawa |
| 5,016,098 A | 5/1991 | Cooper et al. |
| 5,021,888 A | 6/1991 | Kondou et al. |
| 5,029,994 A | 7/1991 | Aoki |
| 5,051,824 A | 9/1991 | Nishigaki |
| 5,111,288 A | 5/1992 | Blackshear |
| 5,119,238 A | 6/1992 | Igarashi |
| 5,172,225 A | 12/1992 | Takahashi |
| 5,198,931 A | 3/1993 | Igarashi |
| 5,228,251 A | 7/1993 | Frigan |
| 5,235,965 A | 8/1993 | Hiroya |
| 5,305,121 A | 4/1994 | Moll |
| 5,374,953 A | 12/1994 | Sasaki et al. |
| 5,376,960 A | 12/1994 | Wurster |
| 5,379,756 A | 1/1995 | Pileski et al. |
| 5,392,431 A | 2/1995 | Pfisterer |
| 5,538,497 A | 7/1996 | Hori |
| 5,579,174 A | 11/1996 | Tachihara et al. |
| 5,587,839 A | 12/1996 | Miyano et al. |
| 5,598,205 A | 1/1997 | Nishioka |
| 5,646,788 A * | 7/1997 | Bietry ......................... 359/740 |
| 6,282,033 B1 * | 8/2001 | Ning ........................... 359/794 |
| 6,744,467 B1 | 6/2004 | Thompson |
| 2001/0036022 A1 * | 11/2001 | Takatsuki ................... 359/756 |

FOREIGN PATENT DOCUMENTS

| | | |
|---|---|---|
| EP | 0 581 286 A1 | 7/1993 |
| JP | 61 006 984 A | 1/1986 |
| JP | 10 206922 A | 8/1998 |
| JP | 63 287 176 A | 11/1998 |
| WO | WO 97/11634 A | 3/1997 |

* cited by examiner

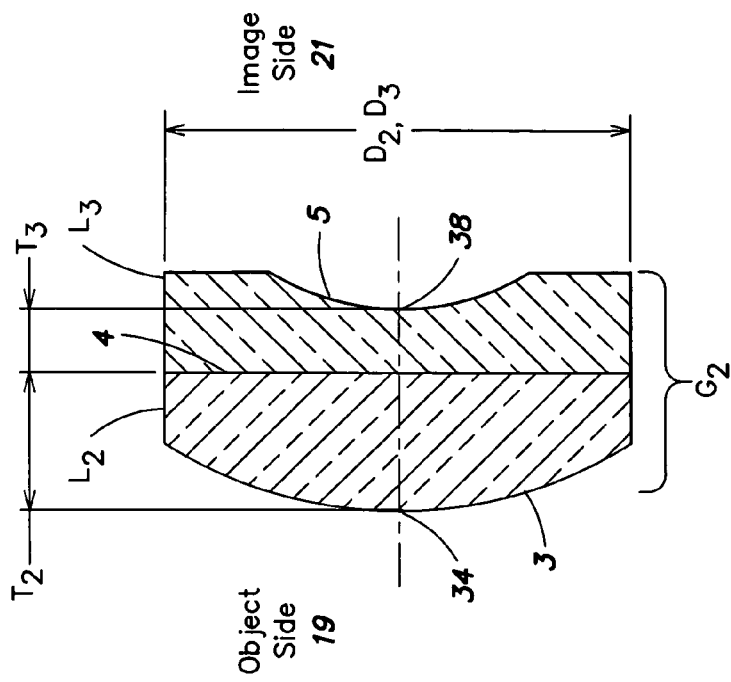
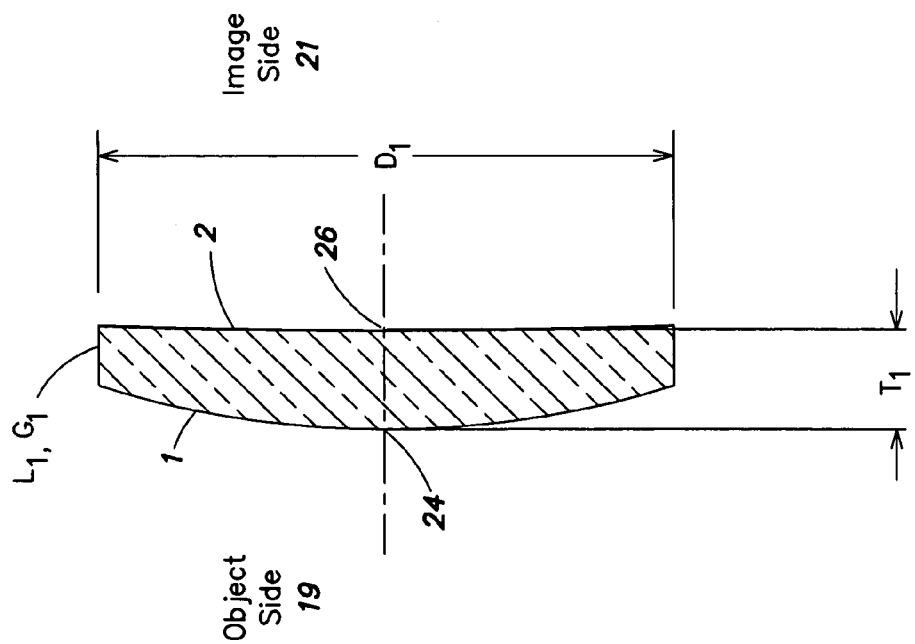

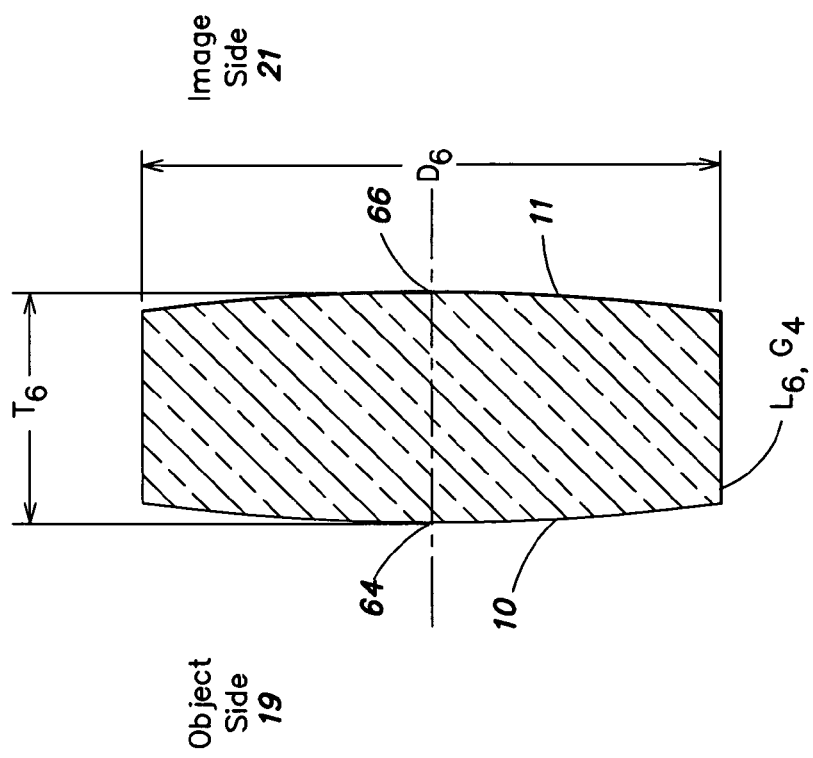
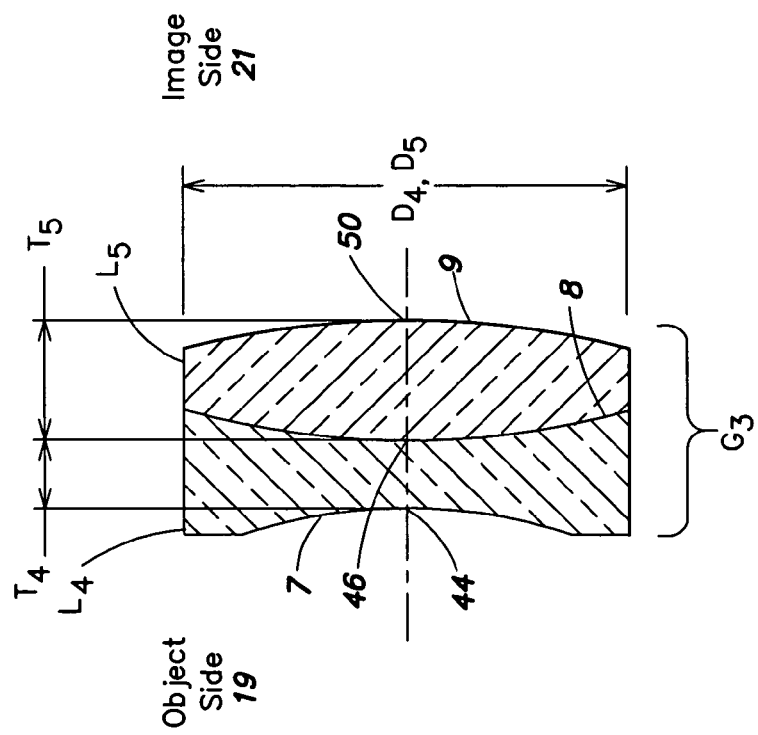
FIG. 5
FIG. 4

Seidel Aberration Coefficients in Waves:

| Surface | Spherical Aberration | Coma | Astigmatism | Field Curvature | Distortion | Longitudinal Chromatic | Tang. Chromatic |
|---|---|---|---|---|---|---|---|
| 1 | 0.13874 | 0.883848 | 1.407644 | 3.539461 | 13.515967 | -1.125674 | -3.585565 |
| 2 | 0.046529 | -1.2892 | 8.930063 | -0.670975 | -52.561525 | -0.498369 | 6.904225 |
| 3 | 0.033756 | 0.185596 | 0.25511 | 7.062572 | 19.766232 | -1.393566 | -3.831026 |
| 4 | 0.039386 | -0.348003 | 0.768702 | 0 | -1.697986 | 0.876421 | -3.87185 |
| 5 | -0.109735 | -1.060194 | -2.560742 | -10.718724 | -57.964059 | 1.713971 | 8.279683 |
| Stop 6 | 0 | 0 | 0 | 0 | 0 | 0 | 0 |
| 7 | -0.579671 | 5.446971 | -12.795822 | -5.680603 | 56.748798 | 1.509037 | -7.089948 |
| 8 | 0.012421 | 0.19626 | 0.775241 | 0.226878 | 4.854619 | 0.289455 | 2.286736 |
| 9 | 0.221645 | -2.250962 | 5.715031 | 3.959724 | -34.616958 | -0.830168 | 4.215473 |
| 10 | -0.000478 | 0.098849 | -5.108631 | 1.971826 | 60.207226 | 0.047268 | -4.88576 |
| 11 | 0.290546 | -2.063967 | 3.665483 | 1.971826 | -13.51337 | -0.585213 | 2.078608 |
| LENS TOTAL | 0.093139 | -0.200802 | 1.052079 | 1.661985 | -5.261056 | 0.003162 | 0.500576 |
| 12 | -0.097443 | 1.241366 | -3.953573 | 0 | 12.591564 | 0.234291 | -1.492367 |
| 13 | 0.078084 | -0.994744 | 3.168116 | 0 | -10.089996 | -0.187744 | 1.195878 |
| 14 | -0.04872 | 0.620667 | -1.976735 | 0 | 6.295617 | 0.117142 | -0.746164 |
| 15 | 0.029361 | -0.374044 | 1.191278 | 0 | -3.794048 | -0.070596 | 0.449675 |
| WINDOW TOTAL | -0.038718 | 0.493245 | -1.570914 | 0 | 5.003137 | 0.093093 | -0.592978 |
| Image | 0 | 0 | 0 | 1.661983 | 0 | 0 | 0 |
| TOTALS | 0.054421 | 0.292443 | -0.518835 | 1.661983 | -0.257919 | 0.096256 | -0.092401 |

FIG. 9

LENS ASSEMBLY AND OPTICAL IMAGING SYSTEM USING SAME

BACKGROUND OF INVENTION

1. Field of Invention

The present application relates to lens assemblies for use in optical imaging systems.

2. Discussion of Related Art

Lens assemblies for imaging objects are known. When designing lens assemblies, a designer may take into account one or more desired characteristics or constraints, such as focal length, back focal length, environment, spacing of lenses, aperture size, overall assembly length, field of view, cost and/or ease of manufacture, ease of use, or any other characteristics or design constraints.

However, it is often difficult to design a lens assembly that meets these sometimes competing design constraints, and this difficulty may be compounded when the lens assembly is intended to be used with additional components, or in specific applications. Examples of such additional components may be filters, lens covers, aperture stops, electronic detectors, electronic devices, or any other components. The resulting image quality produced by the lens assembly is often necessarily compromised in order to satisfy these many design constraints, or in order to achieve certain desired optical characteristics.

SUMMARY OF INVENTION

According to one aspect of the invention, a lens assembly for imaging an object is provided. The lens assembly comprises a plurality of lenses adapted to provide 1) a field of view of approximately 40 degrees, and 2) a distortion of less than approximately 1%.

Another aspect of the invention provides a lens assembly for imaging an object comprising a first lens group having at least one first lens element. The at least one first lens element has a first surface proximal to the object and second surface distal to the object. The lens assembly further comprises a second lens group having at least one second lens element, the at least one second lens element having a first surface proximal to the object and second surface distal to the object. The lens assembly further comprises an aperture stop disposed between the first lens group and the second lens group, wherein the first and second lens groups are arranged to define a focal length, and wherein a distance between the first surface of the at least one first lens element and the second surface of the at least one second lens element is less than approximately 95% of the focal length.

According to one aspect of the invention, an optical system for imaging an object is provided comprising a lens assembly. The lens assembly comprises a plurality of lenses. The optical system further comprises at least one planar plate that introduces an aberration and is in optical communication with the lens assembly. The plurality of lenses is adapted to produce an aberration to compensate the aberration introduced by the at least one planar plate.

According to one aspect of the invention a lens system is provided. The lens system comprises, in order from an object side: a first meniscus lens; a second planar-convex lens; a third planar-concave lens; a fourth bi-concave lens; a fifth bi-convex lens; a sixth bi-convex lens; and a first planar plate.

According to yet another aspect of the invention, a lens system is provided. The lens system includes a plurality of lens elements and an aperture stop, each lens element having a lens surface defined by a radius of curvature (r), a thickness (T), and an index of refraction (n), the plurality of lens elements being spaced from each other by a distance (h). The lens system satisfies at least on of the following conditions:

$1000 < r_4/r_2$ or $r_4 = r_2 =$ approximately infinity;

$-0.56 < r_3/r_9 < -0.81$;

$0.9 < r_8/r_9 < 1.1$ or $r_8 = r_9$;

$0.9 < r_{10}/r_{11} < 1.1$ or $r_{10} = r_{11}$;

$0.7 < (h_1 + h_2)/(h_3 + h_4) < 1.1$;

$0.95 < h_1 + h_2 + h_3 + h_4 + +T_1 + T_2 + T_3 + T_4 + T_5 + T_6 < f/1.02$;

$1.71 < n_{L1}, n_{L2}, n_{L5}, n_{L6} < 1.79$; and $1.67 < n_{L3}, n_{L4} < 1.81$;

where:

$r_2$ represents a radius of curvature of an image side surface of a first lens element; $r_3$ represents a radius of curvature of an object side surface of a second lens element; $r_4$ represents a radius of curvature of an image side surface of the second lens element; $r_8$ represents a radius of curvature of an object side surface of a fifth lens element; $r_9$ represents a radius of curvature of an image side surface of the fifth lens element; $r_{10}$ represents a radius of curvature of an object side surface of a sixth lens element; $r_{11}$ represents a radius of curvature of an image side surface of the sixth lens element; $h_1$ represents a gap distance between the image side surface of the first lens element to the object side surface of the second lens element; $h_2$ represents a gap distance between the image side surface of a third lens element to the aperture stop; $h_3$ represents a gap distance between the aperture stop to an object side surface of a fourth lens element; $h_4$ represents a gap distance between the image side surface of the fifth lens element to the object side surface of the sixth lens element; $T_1$ represents a thickness of the first lens element; $T_2$ represents a thickness of the second lens element; $T_3$ represents a thickness of the third lens element; $T_4$ represents a thickness of the fourth lens element; $T_5$ represents a thickness of the fifth lens element; $T_6$ represents a thickness of the sixth lens element; $n_{L1}$ represents an index of refraction of the first lens element; $n_{L2}$ represents an index of refraction of the second lens element; $n_{L3}$ represents an index of refraction of the third lens element; $n_{L4}$ represents an index of refraction of the fourth lens element; $n_{L5}$ represents an index of refraction of the fifth lens element; and $n_{L6}$ represents an index of refraction of the sixth lens element.

According to yet another aspect of the invention, a lens assembly is provided. The lens assembly includes a plurality of lens elements, and an aperture stop having a size selected from a plurality of aperture stop sizes. The aperture stop optically cooperates with the plurality of lens elements regardless of the aperture stop size, such that a lens assembler may select an aperture stop for use with the lens assembly without reconfiguring a physical relationship of the plurality of lenses.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

Various embodiments of the invention will now be described, by way of example, with reference to the accompanying drawings, in which:

FIG. 2 is a cross-sectional representation of a first lens group of the lens assembly of FIG. 1.

FIG. 3 is a cross-sectional representation of a second lens group of the lens assembly of FIG. 1.

FIG. 4 is a cross-sectional representation of a third lens group of the lens assembly of FIG. 1.

FIG. 5 is a cross-sectional representation of a fourth lens group of the lens assembly of FIG. 1.

FIG. 9 is an illustrative embodiment of values of aberrations associated with a lens assembly according to an aspect of the present invention.

DETAILED DESCRIPTION

Figure 1:
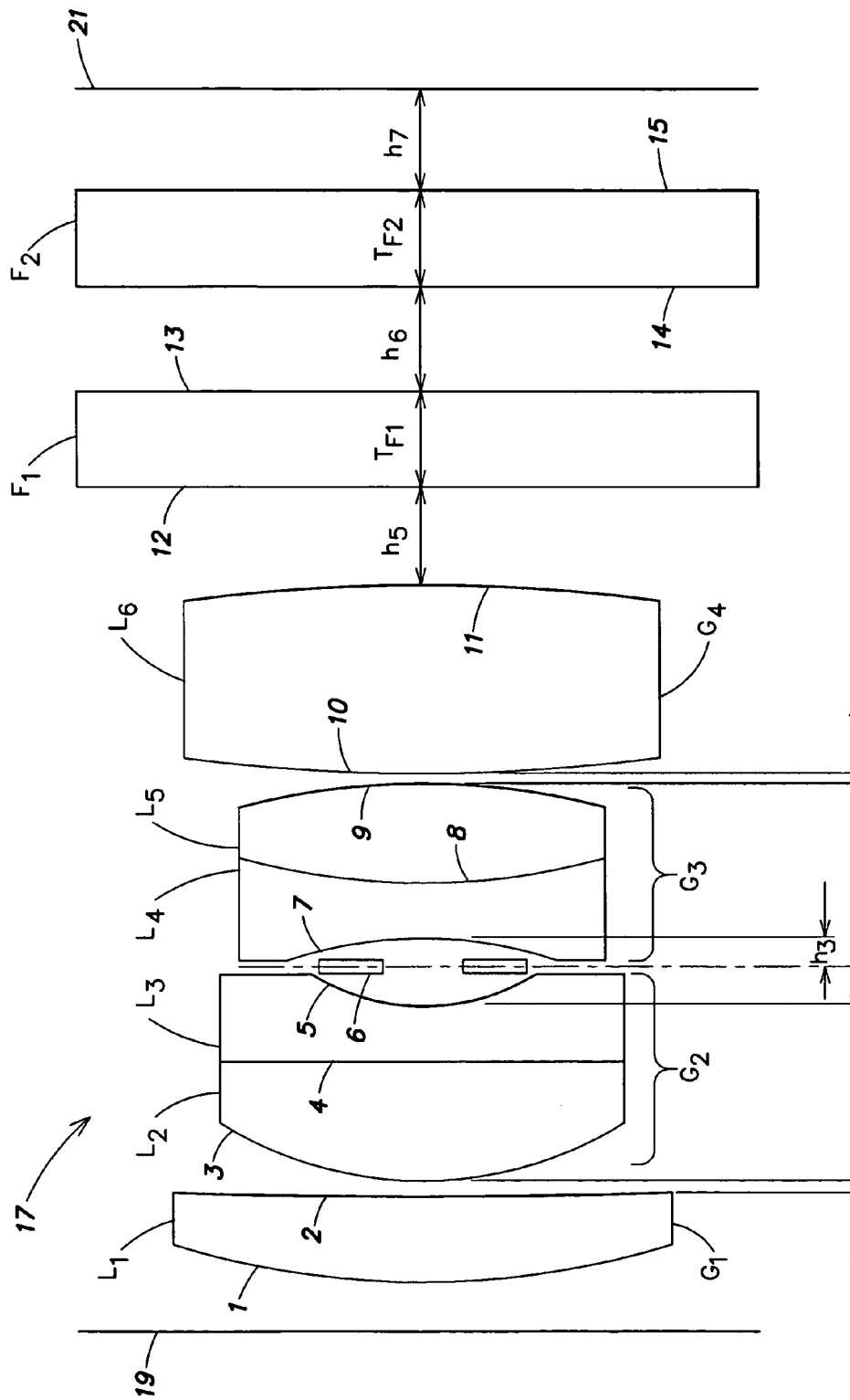
FIG. 1 is a schematic representation of a lens assembly according to one aspect of the present invention.

According to aspects of the invention, the lens assembly is constructed to accommodate certain, often competing, design characteristics. In one aspect, the lens assembly provides high optical performance in a compact and easy to manufacture system (e.g., construct, assemble, and align). The lens assembly allows a manufacturer to produce a lens arrangement that is common among various aperture sizes so that manufacturability is enhanced. The lens assembly is also suitable for use in connection with additional components, such as filters and/or electronic detectors, such as CCD's and/or CMOS's.

In one aspect, the lens assembly is arranged to provide a relatively wide angle field of view, such as approximately 40 degrees, with minimal distortion, for example, less than 1%. The lens assembly according to this aspect may also be constructed to provide a ratio of the length of the lens assembly to the back focal length of approximately 1.39 to accommodate additional components, such as optical filters. In one embodiment the back focal length is 6 mm.

According to another aspect of the invention, the lens assembly is of a miniature and compact design, which may find suitable use as a security camera, an inspection camera, or as a personal use camera, as will be discussed in more detail below. One embodiment of a compact lens assembly has a focal length that is greater than the length of the lens assembly. The lens assembly may provide relatively high image quality without the need to space the lens elements by large distances, and without substantially increasing thicknesses of one or more of the lenses, thus enabling the compact design. For example, a distance between the first surface of the first lens element and the last surface of the last lens element is less than approximately 95% of the focal length. The lens assembly may be configured to be approximately ⅓ of an inch long.

According to one embodiment, the lens assembly is a four group, six element, lens assembly. The first lens group, nearest an object to be imaged, comprises a first lens have a convex surface proximate the object and a concave surface distal the object. The second lens group includes second and third lens elements, cemented together. The second lens element is a positive lens element, having a convex surface proximate the object, and a planar surface distal the object. The third lens element is a negative lens element and has a planar surface proximate the object and a concave surface distal the object. The third lens group includes a fourth lens element cemented to a fifth lens element. The fourth lens element is a negative lens element and has a concave surface proximate the object and a concave surface distal the object. The fifth lens element is a positive lens element having a convex surface proximate the object and convex surface distal the object. The lens assembly also includes a sixth lens element, having convex surfaces proximate and distal the object to be imaged. In one embodiment, the above-listed lens elements are immediately adjacent each other. In one embodiment, an aperture stop (also referred to as aperture plate, aperture, stop, or micro-plate) is disposed between the second and third lens groups, and more specifically, between the third and fourth lens elements. In another embodiment, the aperture stop is disposed between the third and fourth lens elements, with the other lens elements being immediately adjacent each other.

The lens assembly may also incorporate filter plates, while maintaining a high quality image. The filter plates may be low-pass filter plates, color correction plates, or any other type of filter plate. In one embodiment, one or more parallel filter plates having planar surfaces may be disposed between the sixth lens element and the image plane. Such filter plates often produce aberrations, such as coma and astigmatism, or other aberrations, in the resulting image of the object. An aspect of the present application provides correction for such coma and astigmatism introduced by using plane parallel plates with a lens assembly. According to one embodiment, the lens assembly contains compensating aberrations to compensate the aberrations of plane parallel plates.

The structure of the lens assembly is nearly symmetric. A perfectly symmetric design departs from telecentricity. Certain electronic sensors or detectors may require some telecentricity provided by this optical design.

From a manufacturing perspective, the lens assembly may accommodate any one of a plurality of differently sized aperture stops without the need for re-arranging or re-designing the lenses, or their relationship to one another, while maintaining the desired characteristics of wide field of view and low distortion. In this manner, the lens manufacturer can easily change the aperture stop as desired by the user while maintaining the lenses in a fixed relationship relative to each other. The aperture stop may be held relative to the lens assembly by one or more lenses. In this regard, the aperture stop may be held by physical contact with the one or more lenses.

The above aspects of the invention may be employed in any suitable combination as the present invention is not limited in this respect. Also, any or all of the above aspects may be employed in a relatively small imaging system; however, the present invention is not limited in this respect, as aspects of the invention may be used on any type of imaging system, including those that may be larger or smaller than the embodiments described. In addition, the lens assembly may be employed in any device and may be employed with any type of camera, including digital or film-based cameras. Various aspects and embodiments of the invention will now be described in more detail with respect to the accompanying figures. The invention is not, however, limited to the aspects and embodiments shown. In some of the figures that follow, specific numerical values are used to describe the elements and/or optical parameters. It should be appreciated that such values are not necessarily limiting, but rather, that the values may fall within a range of acceptable limits.

FIG. 1 illustrates one embodiment of a lens assembly 17 according to the present invention. The lens assembly comprises four lens groups $G_1$, $G_2$, $G_3$, and $G_4$, arranged in order from an object side 19 to an image side 21. Lens group $G_1$ includes a single lens element $L_1$. Lens group $G_2$ includes two lens elements, $L_2$ and $L_3$. Lens group $G_3$ includes two lens elements, $L_4$ and $L_5$. Lens group $G_4$ includes a single lens element $L_6$. The lens assembly may also include an aperture stop 6 disposed between lenses $L_3$ and $L_4$. In one embodiment, planar parallel plates $F_1$ and $F_2$ are disposed between lens $L_6$ and the image side 21 of the lens assembly 17. As an example, planar plate $F_1$ may be cover glass (e.g., for covering the detector (not shown)), while planar plate $F_2$ may be a low-pass filter. Planar plates $F_1$ and $F_2$ may alternatively be any planar parallel plates. Surfaces 12, 13, 14, and 15 are all planar, and thus each has a near infinite radius of curvature. The thicknesses, T, and gap distances, h, of FIG. 1 are described in more detail in what follows.

The introduction of planar parallel plates, such as $F_1$ and $F_2$ in FIG. 1, into an optical system may introduce aberrations into the system. However, such planar plates may be necessary for use with CCD or CMOS devices. A lens assembly which is designed in the absence of planar parallel plates may suffer performance degradation if one or more planar parallel plates are subsequently inserted into the assembly. To achieve satisfactory performance, it may be necessary to design the lens assembly to compensate for such aberrations, so that a satisfactory image quality may result with the use of the planar plates. Thus, according to one aspect of the invention, as will be described in more detail below, the combination of lenses $L_1$–$L_6$ compensates for any aberrations introduced by the planar parallel plates $F_1$ and $F_2$.

In the following description, radii of curvature are listed for several surfaces of lens elements. As is conventional, the radii will be listed with a positive value when the surface bows toward an object side of the lens, and with a negative value when the surface bows toward an image side of the lens. Also, the numerical values discussed in connection with FIGS. 2–6 correspond to an assembly designed for use with a ⅓ inch CCD device while providing approximately 40 degree field of view. It should be appreciated that the values will differ if the lenses are scaled for use with another device, as will be mentioned in relation to Tables 3–9. Such scaling of components is meant to be encompassed within the present invention. The following embodiment reflects a lens assembly having an 8.36 mm focal length. However, as will be seen below, other suitable focal lengths may be employed, such as 10 mm.

Lens $L_1$, the cross-section of which is shown in more detail in FIG. 2, includes a convex surface 1 facing toward the object side 19 of the lens assembly 17, and having a radius of curvature of approximately 7.67 mm. Lens $L_1$ also includes a concave surface 2 facing the image side 21 of the lens assembly 17, and having a radius of curvature of approximately 40.46 mm. The thickness $T_1$ of the lens, measured from the vertex 24 of the object side surface 1 to the vertex 26 of the image side surface 2 is approximately 0.895 mm. The lens is circular with a diameter $D_1$ of approximately 5 mm. In one embodiment, the lens is made of glass, with an index of refraction, $N_d$, of approximately 1.788309, and a dispersion, v, of approximately 47.47. However, it should be appreciated that the present invention is not limited in this respect, as other suitable materials and/or other suitable indexes of refraction and/or dispersion may be employed. Both the object side surface 1 and image side surface 2 are coated with approximately 0.5876 µm of Ar, although other suitable coatings (or no coating at all) may be employed, as the present invention is not limited in this respect.

FIG. 3 is a cross-sectional view of the second lens group $G_2$ of FIG. 1. The second lens group $G_2$ includes lenses $L_2$ and $L_3$, which are cemented together, and share a common planar mid-surface 4. Lens $L_2$ includes a convex surface 3 facing toward the object side 19 of the lens assembly 17, and having a radius of curvature of approximately 3.72 mm. The object side surface 3 is coated with approximately 0.5876 µm of Ar, although other suitable coatings (or no coating at all) may be employed, as the present invention is not limited in this respect. The thickness $T_2$ of lens $L_2$, as measured from the vertex 34 of the object side surface 3 to the shared mid-surface 4 of lens group $G_2$, is approximately 1.19 mm. Lens $L_2$ is circular and has a diameter $D_2$ of approximately 4 mm. Lens $L_2$ is made of glass, and has an index of refraction, $N_d$, of approximately 1.744002 and a dispersion, v, of approximately 44.72. However, it should be appreciated that the present invention is not limited in this respect, as other suitable materials and/or other suitable indexes of refraction and/or dispersion may be employed.

Lens $L_3$ has a concave surface 5 facing toward the image side 21 of the lens assembly 17, and having a radius of curvature of approximately 2.4 mm. The image side surface 5 is coated with approximately 0.5876 µm of Ar, although other suitable coatings (or no coating at all) may be employed, as the present invention is not limited in this respect. The thickness $T_3$ of lens $L_3$, measured from the vertex 38 of image side surface 5 to the shared mid-surface 4 of lens group $G_2$ is approximately 0.6 mm. As with lens $L_2$, lens $L_3$ is circular and has a diameter $D_3$ of approximately 4 mm. Lens $L_3$ is made of glass and has an index of refraction, $N_d$, of approximately 1.717360 and a dispersion, v, of approximately 29.51. However, it should be appreciated that the present invention is not limited in this respect, as other suitable materials and/or other suitable indexes of refraction and/or dispersion may be employed. Lenses $L_2$ and $L_3$ may be cemented together by any suitable means, as may be known in the art, for example UV epoxy. However, it should be appreciated that the invention is not limited in this regard.

FIG. 4 illustrates a cross-sectional view of lens group $G_3$ of FIG. 1, including lenses $L_4$ and $L_5$. Lenses $L_4$ and $L_5$ are cemented together, and thus share a common mid-surface 8 having a radius of curvature of approximately 6.635 mm (which is concave on lens $L_4$ and convex on lens $L_5$). Lens $L_4$ also includes a concave surface 7 facing toward the object side 19 of the lens assembly 17, and having a radius of curvature of approximately −4.36 mm. The left surface of lens $L_4$ is coated with approximately 0.5876 µm of Ar, although other suitable coatings (or no coating at all) may be employed, as the present invention is not limited in this respect. The thickness $T_4$ of lens $L_4$, measured from the vertex 44 of the object side surface 7 to the vertex 46 of the shared mid-surface 8 is approximately 0.58 mm. Lens $L_4$ is circular with a diameter $D_4$ of approximately 3.5 mm. Lens $L_4$ is made of glass, and has an index of refraction, $N_d$, of approximately 1.672697 and a dispersion, v, of approximately 32.21. However, it should be appreciated that the present invention is not limited in this respect, as other suitable materials and/or other suitable indexes of refraction and/or dispersion may be employed.

Lens $L_5$ includes a convex surface 9 facing toward the image side 21 of the lens assembly 17, and having a radius of curvature of approximately −6.635 mm. The image side surface 9 of lens $L_5$ is coated with 0.5876 μm of Ar, although other suitable coatings (or no coating at all) may be employed, as the present invention is not limited in this respect. The thickness $T_5$ of lens $L_5$, measured from the vertex 50 of the image side surface 9 to the vertex 46 of the common mid-surface 8 is approximately 1 mm. Lens $L_5$ is circular with a diameter $D_5$ of approximately 3.5 mm. In one embodiment, lens $L_5$ is made of glass, and has an index of refraction, $N_d$, of approximately 1.744002 and a dispersion, v, of approximately 44.72. However, it should be appreciated that the present invention is not limited in this respect, as other suitable materials and/or other suitable indexes of refraction and/or dispersion may be employed. Lenses $L_4$ and $L_5$ may be cemented together by any suitable means, as may be known in the art, for example UV epoxy. However, it should be appreciated that the invention is not limited in this regard.

FIG. 5 is a cross-sectional view of lens group $G_4$ of FIG. 1, which includes lens $L_6$. Lens $L_6$ has a convex surface 10 facing toward the object side 19 of the lens assembly 17, and having a radius of curvature of approximately 13 mm. The object side surface 10 is coated with approximately 0.5876 μm of Ar, although other suitable coatings (or no coating at all) may be employed, as the present invention is not limited in this respect. Lens $L_6$ also has a convex surface 11 facing toward the image side 21 of the lens assembly 17, and having a radius of curvature of approximately −13 mm. The image side surface 10 is also coated with approximately 0.5876 μm of Ar, although other suitable coatings (or no coating at all) may be employed, as the present invention is not limited in this respect. The thickness $T_6$ of lens $L_6$, measured from the vertex 64 of the object side surface 10 to the vertex 66 of the image side surface 11 is approximately 1.89 mm. Lens $L_6$ is circular with a diameter $D_6$ of approximately 4.5 mm. Lens $L_6$ is made of glass, with an index of refraction, $N_d$, of approximately 1.713003 and a dispersion, v, of approximately 53.83. However, it should be appreciated that the present invention is not limited in this respect, as other suitable materials and/or other suitable indexes of refraction and/or dispersion may be employed.

The distances shown in FIG. 1 should be controlled to ensure satisfactory performance of the lens assembly. Distance $h_1$ is the gap distance from the vertex 26 of surface 2 to the vertex 34 of surface 3. Gap distance $h_2$ is the distance from vertex 38 of surface 5 to the plane of the aperture stop 6, indicated in FIG. 1. Gap distance $h_3$ is measured from plane of the aperture stop 6 to the vertex 44 of surface 7. Gap distance $h_4$ is measured from the vertex 50 of surface 9 to the vertex 64 of surface 10. Gap distance $h_5$ is measured from the vertex 66 of surface 11 to the surface 12. Gap distance $h_6$ is measured from the surface 13 to the surface 14, and gap distance $h_7$ is measured from the surface 15 to an image plane, as shown in FIG. 1. Satisfactory performance is maintained by the lens assembly 17 for any values of $h_5$, $h_6$, $h_7$, and the thicknesses of the planar plates, $T_{F1}$ and $T_{F2}$, provided the following relationship is approximately observed: 1 mm $\leq T_{F1}+T_{F2} \leq$ 3 mm, and the total thickness of $h_5+h_6+h_7+T_{F1}+T_{F2}$ is less than or equal to the total back focal length of the lens assembly, as would be known to one of skill in the art.

According to one aspect of the invention, a housing 70 is provided to hold the lenses $L_1$–$L_6$ of FIG. 1, and to ensure the values of $h_1$, $h_{b\ 2}$, $h_3$, and $h_4$ are maintained appropriately. The housing 70, in the absence of the lenses, is shown in cross-sectional view in FIG. 6. In one embodiment, the housing 70 includes ten step locations, $S_1$–$S_{10}$. The steps are formed in the housing for the purpose of receiving the lenses $L_1$–$L_6$ and an aperture stop, and ease the process of assembling the lenses $L_1$–$L_6$. The length and diameter of each step location is shown in Table 1. The lengths are given relative to the x-axis in FIG. 6, and the diameters relative to the y-axis. Some of the step locations have more than one diameter, in which case Table 1 below indicates the minimum diameter. The length 71 of the housing is approximately 7.4 mm. The following data is for the invention scaled to 8.36 mm focal length.

TABLE 1

| Housing Step Sizes | | |
|---|---|---|
| Step Number | Step Length (mm) | Step Diameter (mm) |
| $s_1$ | 0.60 | 5.76* |
| $s_2$ | 0.34 | 5.76 |
| $s_3$ | 0.38 | 5.02 |
| $s_4$ | 1.14 | 4.51 |
| $s_5$ | 1.14 | 4.02 |
| $s_6$ | 1.14 | 3.51 |
| $s_7$ | 0.94 | 4.01 |
| $s_8$ | 0.76 | 4.52 |
| $s_9$ | 0.41 | 5.27 |
| $s_{10}$ | 0.65 | 5.27* |

*The listed value corresponds to the minimum diameter of the step.

The housing 70 may be formed with threads to allow the housing to be threaded in and held relative to another component, such as a camera housing. In one embodiment, the housing is formed with an M9 thread, having, e.g., outer diameter of approximately 8.9 mm and a pitch diameter of approximately 8.6 mm. Of course, other suitable thread configurations or other suitable attaching arrangements may be employed, as the present invention is not limited in this respect. Wrench flats 76 may be formed along the length of the housing, or as shown, along a portion of the housing to facilitate threading the housing to the other component. The width 72 across the wrench flats is approximately 7 mm. Other suitable arrangements to facilitate threading the housing, such as, e.g., spanner wrench slots, may be employed, as the present invention is not limited in this respect.

In one embodiment, the housing is formed of metal. However, it should be appreciated that the housing could be formed out of any material, including plastics, ceramics, or any other type of material, as the invention is not limited in this regard.

Figure 6:
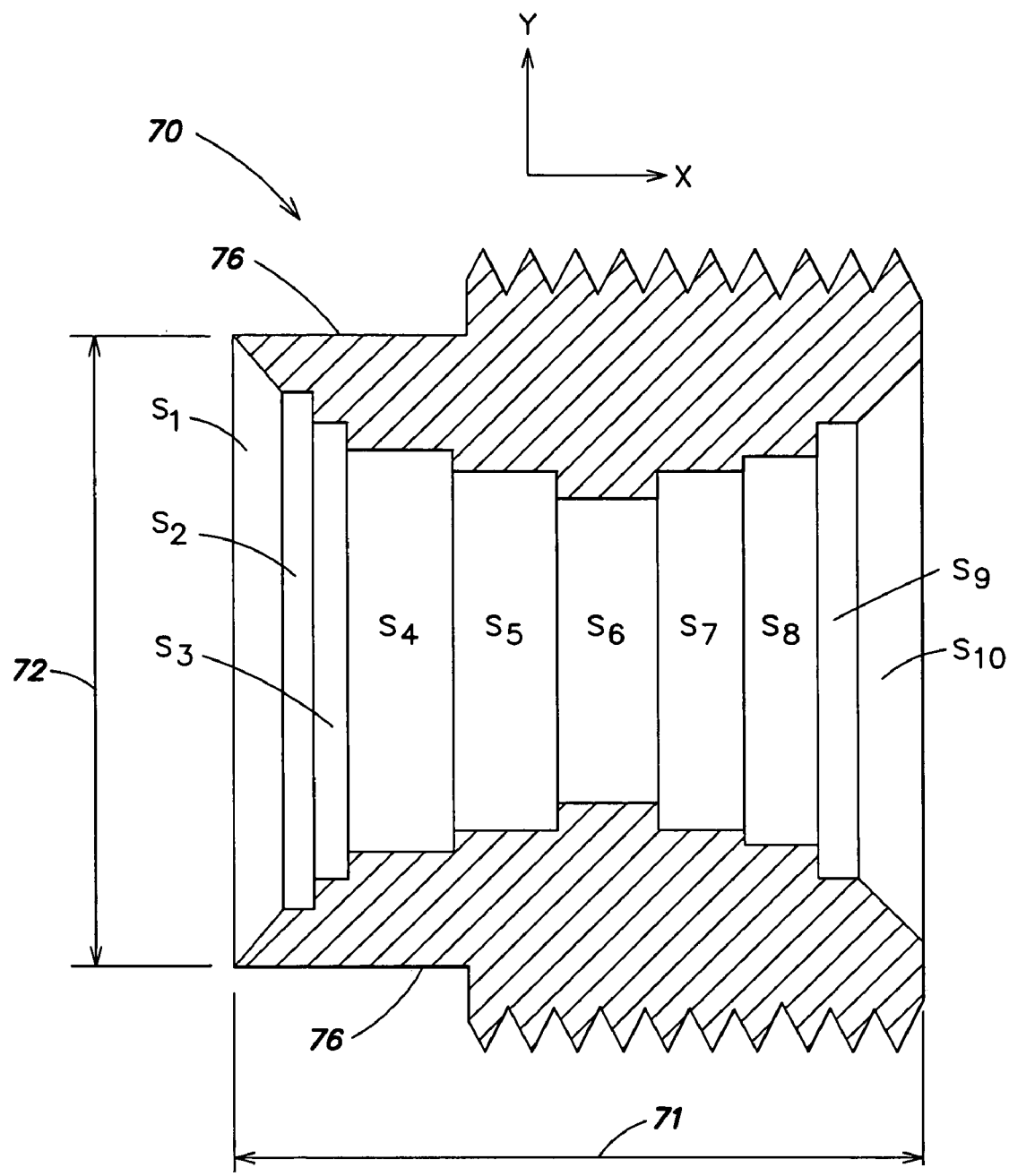
FIG. 6 is a cross-sectional representation of a housing for housing the lens assembly of FIG. 1.
Figure 7:
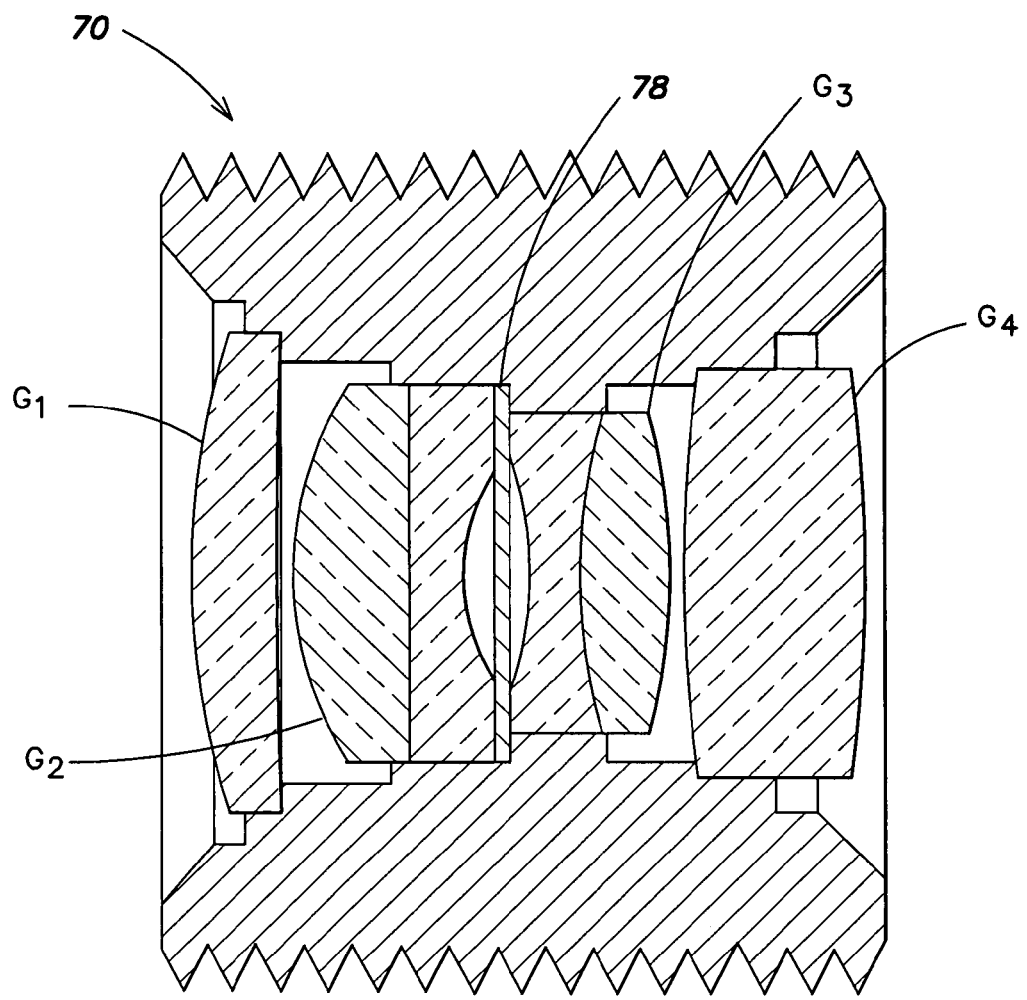
FIG. 7 is a cross-sectional representation of the housing of FIG. 6 with the lenses of the lens assembly of FIG. 1.

FIG. 7 is a cross-sectional view of the lens groups $G_1$, $G_2$, $G_3$, and $G_4$, of FIG. 1 within the housing 70 of FIG. 6. It should be appreciated that housing 70 shown in FIG. 7 is rotated at 90 degrees relative to the view in FIG. 6, so that the wrench flats 76 are not evident.

In one embodiment, an aperture stop 78, described in further detail below, may be disposed in step $S_5$ of the housing. Lens group $G_2$ may be disposed in step $S_5$ so as to contact the aperture stop 78, thereby enhancing holding the aperture stop in the housing. Lens group $G_3$ is disposed in step $S_6$ of the housing, and may also contact the aperture stop. Of course, the aperture stop may be held in place by other suitable arrangements, as the present invention is not limited in this respect. Lens group $G_1$ is disposed in step $S_3$ of the housing, and lens group $G_4$ is disposed in step $S_8$ of the housing. By using the step locations in the housing, the lens groups $G_1$–$G_4$ are spaced appropriately to ensure proper function of the lens assembly. In other words, the distances $h_1$, $h_2$, $h_3$, and $h_4$ are maintained at appropriate values.

The lens groups may fit snugly within the housing steps, or may be secured within the housing by any means, for instance glue or other suitable adhesive.

Figure 8A:
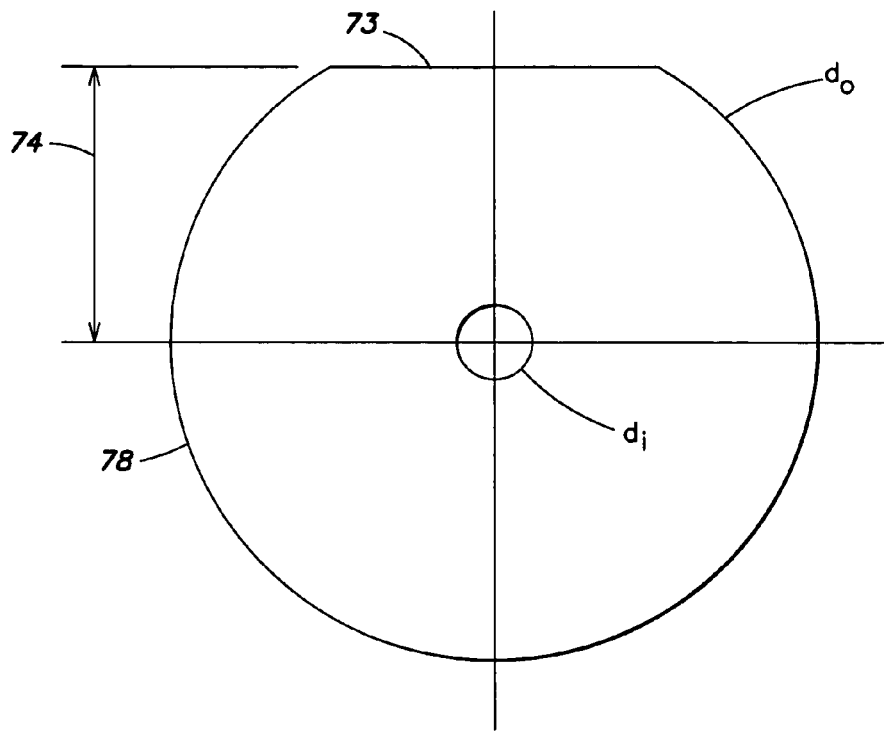
FIGS. 8A and 8B illustrate an example of an aperture stop.
Figure 8B:
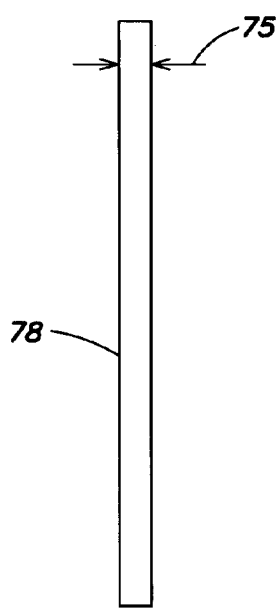

FIGS. 8A and 8B show an aperture stop 78 that may be used in combination with lenses $L_1$–$L_6$ of FIG. 1. As discussed above, the aperture stop may be disposed between lenses $L_3$ and $L_4$, as shown in FIG. 7. The aperture stop 78 may be a plate with a circular opening in the center. The plate may be formed of aluminum and may include a surface finish of BI-Fluoride etch followed by type 2 black anodize. Other materials and finishes may be used for the plate, and the invention is not limited in this regard.

FIG. 8A illustrates a front-on view of the micro-plate, which has a circular outer diameter, $d_0$, of approximately 4 mm, and a flat edge 73 that is spaced from the center of the micro-plate by a distance 74. The distance 74 between the flat edge 73 and the center of the micro-plate may be approximately 1.88 mm from the center of the micro plate. The size of the aperture stop, which may also be designated by f number, corresponds to the diameter $d_i$ of the central circular opening and may be any one of several values, as listed in Table 2, for example. According to an aspect of the invention, any of the values listed in Table 2 may be used without needing to reposition the lenses $L_1$–$L_6$ relative to each other. In other words, the performance of the lens assembly remains within satisfactory limits for any of the aperture sizes.

FIG. 8B illustrates a side view of the micro-plate of FIG. 8A. In one embodiment, the thickness 75 of the plate is approximately 0.127 mm, although other suitable thicknesses may be employed as the present invention is not limited in this respect. The following data is for the invention scaled to 8.36 mm focal length.

TABLE 2

Aperture Stop Size

| f number | Outer Diameter (mm) | Inner Diameter (mm) |
|---|---|---|
| f11 | 4 | 0.48 |
| f8 | 4 | 0.66 |
| f5.6 | 4 | 0.95 |
| f4 | 4 | 1.33 |
| f2.8 | 4 | 1.89 |

As discussed above, an aspect of the present application provides correction for coma and astigmatism that may be introduced by using plane parallel plates with a lens assembly. According to one embodiment, the lens assembly includes compensating aberrations to compensate the aberrations of plane parallel plates. FIG. 9 is a non-limiting example of values of Seidel aberration coefficients, in units of waves, of seven types of aberrations that may be introduced in the lens assembly according to the present invention. Values are listed for each surface of the lenses, 1–5 and 7–11, the aperture stop 6, as well as the surfaces 12–15 of two the planar plates $F_1$ and $F_2$ (the combination of which is referred to as a "window" in FIG. 9). In the embodiment described herein, the two planar plates include one cover glass and one low-pass filter. The seven types of aberrations listed are spherical aberration, coma, astigmatism, field curvature, distortion, longitudinal chromatic aberration, and tangential chromatic aberration. Diffraction is not listed, as it is a second order effect in the system due to the range of aperture stop sizes used.

The total values listed for each type of aberration are computed by a sum of the "lens total" value and the "window total" value. The aperture stop and the image do not contribute to the seven listed types of aberrations of the system, as indicated by the values of zero in the appropriate rows. In one embodiment, the lens assembly is a double-Gauss lens assembly. It can be seen that the double-Gauss lens assembly produces compensating aberrations to compensate for the aberrations of the planar plates. The lens design thus produces a satisfactory image quality for any window wherein the thickness of the window, $T_{F1}+T_{F2}$, is approximately within the range of 1–3 mm. Thus, the lens design allows the user to choose the specific types of planar plates, such as filters, cover glass, etc., for the desired application.

It will be appreciated that while specific values for radii of curvature, index of refraction, and dispersion of the lens elements have been listed in connection with FIGS. 1–5, there exists a range of values within which each parameter may fall while still providing satisfactory performance of the lens assembly. The values corresponding to additional embodiments are shown in Tables 3–9. The values of $T_{F1}$, $T_{F2}$, $h_5$, $h_6$, and $h_7$ are not listed since, as mentioned previously, satisfactory image quality is obtained as long as the following relationship is approximately observed: 1 mm $\leq T_{F1}+T_{F2} \leq 3$ mm, and the total thickness of $h_5+h_6+h_7+T_{F1}+T_{F2}$ is less than equal to the total back focal length of the lens assembly. It should be appreciated that the values listed in Tables 3–9 correspond to a lens assembly having a focal length, f, of 10 mm. As is known to those of skill in the art, the listed values in Tables 3–9 will change in a known way if the lens assembly is scaled to a focal length other than 10 mm. Thus, the values could be scaled to enable use with CCD or CMOS devices of varying dimension, while maintaining approximately a 40 degree field of view. The present invention is meant to encompass such alterations attained by scaling of the lens assembly. It should also be noted that for the embodiments of Tables 3–9, the step locations of the housing 70 of FIG. 6 may need to be altered to maintain the proper gap distances, if the housing were to be used to hold the lens assembly. Also note that in Tables 3–9 the listed thicknesses correspond to the axial distance to the next surface.

TABLE 3

Prescription 1 For f = 10 mm

| Surface | Radius of Curvature r (mm) | Thickness (mm) | Refractive Index (Nd) | Abbe No. (Vd) |
|---|---|---|---|---|
| 1 | 9.172 | 1.070 | 1.788 | 47.47 |
| 2 | 48.384 | 0.161 | 1 | |
| 3 | 4.449 | 1.423 | 1.744 | 44.72 |
| 4 | Infinity | 0.718 | 1.717 | 29.51 |
| 5 | 2.870 | 0.369 | 1 | |
| 6 | Infinity | 0.435 | Aperture stop | |
| 7 | −5.214 | 0.694 | 1.673 | 32.21 |
| 8 | 7.935 | 1.196 | 1.744 | 44.72 |
| 9 | −7.935 | 0.126 | 1 | |
| 10 | 15.546 | 2.260 | 1.713 | 53.83 |
| 11 | −15.546 | | | |

TABLE 4

Prescription 2 For f = 10 mm

| Surface | Radius of Curvature r (mm) | Thickness (mm) | Refractive Index (Nd) | Abbe No. (Vd) |
|---|---|---|---|---|
| 1 | 9.534 | 1.064 | 1.744 | 44.72 |
| 2 | 55.149 | 0.113 | 1 | |
| 3 | 4.495 | 1.429 | 1.744 | 44.72 |
| 4 | Infinity | 0.721 | 1.673 | 32.25 |
| 5 | 2.848 | 0.370 | 1 | |
| 6 | Infinity | 0.437 | Aperture | |
| 7 | −4.830 | 0.697 | 1.673 | 32.25 |
| 8 | 7.089 | 1.200 | 1.744 | 44.72 |
| 9 | −7.089 | 0.126 | 1 | |
| 10 | 17.624 | 2.268 | 1.744 | 44.72 |
| 11 | −17.624 | | | |

TABLE 5

Prescription 3 For f = 10 mm

| Surface | Radius of Curvature r (mm) | Thickness (mm) | Refractive Index (Nd) | Abbe No. (Vd) |
|---|---|---|---|---|
| 1 | 9.222 | 1.076007 | 1.757 | 47.81 |
| 2 | 56.061 | 0.054011 | 1 | |
| 3 | 4.419 | 1.422968 | 1.717 | 47.96 |
| 4 | Infinity | 0.717463 | 1.673 | 32.25 |
| 5 | 2.839 | 0.368895 | 1 | |
| 6 | Infinity | 0.434663 | Aperture | |
| 7 | −5.014 | 0.693547 | 1.673 | 32.25 |
| 8 | 7.383 | 1.195772 | 1.717 | 47.96 |
| 9 | −7.383 | 0.125556 | 1 | |
| 10 | 16.689 | 2.170737 | 1.757 | 47.81 |
| 11 | −16.689 | | | |

TABLE 6

Prescription 4 For f = 10 mm

| Surface | Radius of Curvature r (mm) | Thickness (mm) | Refractive Index (Nd) | Abbe No. (Vd) |
|---|---|---|---|---|
| 1 | 9.067 | 1.096 | 1.757 | 47.81 |
| 2 | 57.422 | 0.056 | 1 | |
| 3 | 4.429 | 1.375 | 1.717 | 47.96 |
| 4 | Infinity | 0.723 | 1.673 | 32.25 |
| 5 | 2.843 | 0.372 | 1 | |
| 6 | Infinity | 0.438 | Aperture | |
| 7 | −5.047 | 0.699 | 1.673 | 32.25 |
| 8 | 7.411 | 1.250 | 1.717 | 47.96 |
| 9 | −7.411 | 0.127 | 1 | |
| 10 | 17.285 | 2.255 | 1.773 | 49.62 |
| 11 | −17.285 | | | |

TABLE 7

Prescription 5 For f = 10 mm

| Surface | Radius of Curvature r (mm) | Thickness (mm) | Refractive Index (Nd) | Abbe No. (Vd) |
|---|---|---|---|---|
| 1 | 9.294 | 1.090 | 1.757 | 47.81 |
| 2 | 59.204 | 0.042 | 1 | |
| 3 | 4.443 | 1.433 | 1.717 | 47.96 |
| 4 | Infinity | 0.723 | 1.673 | 32.25 |
| 5 | 2.853 | 0.372 | 1 | |
| 6 | Infinity | 0.438 | Aperture | |

TABLE 7-continued

Prescription 5 For f = 10 mm

| Surface | Radius of Curvature r (mm) | Thickness (mm) | Refractive Index (Nd) | Abbe No. (Vd) |
|---|---|---|---|---|
| 7 | −5.057 | 0.698 | 1.673 | 32.25 |
| 8 | 7.457 | 1.204 | 1.717 | 47.96 |
| 9 | −7.457 | 0.126 | 1 | |
| 10 | 16.987 | 2.271 | 1.773 | 49.57 |
| 11 | −16.987 | | | |

TABLE 8

Prescription 6 For f = 10 mm

| Surface | Radius of Curvature r (mm) | Thickness (mm) | Refractive Index (Nd) | Abbe No. (Vd) |
|---|---|---|---|---|
| 1 | 10.109 | 1.178 | 1.744 | 44.72 |
| 2 | Infinity | 0.024 | 1 | |
| 3 | 4.593 | 1.272 | 1.744 | 44.72 |
| 4 | Infinity | 0.718 | 1.750 | 34.95 |
| 5 | 3.109 | 0.369 | 1 | |
| 6 | Infinity | 0.435 | Aperture | |
| 7 | −4.404 | 0.695 | 1.717 | 29.51 |
| 8 | 5.733 | 1.673 | 1.744 | 44.72 |
| 9 | −5.733 | 0.126 | 1 | |
| 10 | 19.846 | 1.178 | 1.744 | 44.72 |
| 11 | −19.846 | | | |

TABLE 9

Prescription 7 For f = 10 mm

| Surface | Radius of Curvature r (mm) | Thickness (mm) | Refractive Index (Nd) | Abbe No. (Vd) |
|---|---|---|---|---|
| 1 | 10.427 | 1.487 | 1.717 | 47.96 |
| 2 | Infinity | 0.242 | 1 | |
| 3 | 4.224 | 1.311 | 1.744 | 44.72 |
| 4 | Infinity | 0.705 | 1.801 | 35.08 |
| 5 | 2.983 | 0.366 | 1 | |
| 6 | Infinity | 0.431 | Aperture | |
| 7 | −4.461 | 0.695 | 1.673 | 32.21 |
| 8 | 6.205 | 1.352 | 1.744 | 44.72 |
| 9 | −6.205 | 0.125 | 1 | |
| 10 | 17.516 | 1.487 | 1.744 | 44.72 |
| 11 | −17.516 | | | |

Figure 10:
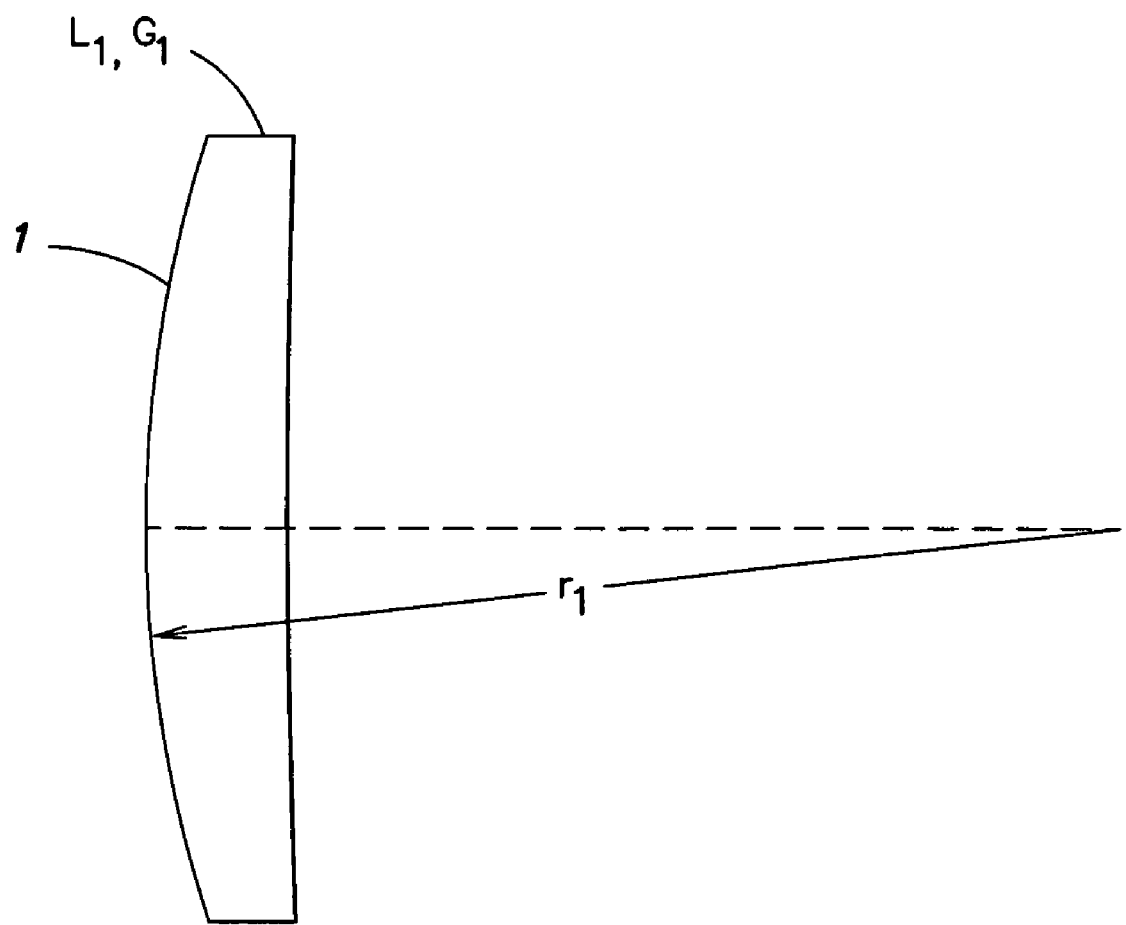
FIG. 10 illustrates the radius of curvature of a lens element.

In a more general sense, the design of the lens assembly of FIG. 1, according to the present invention, may obey any, all, or any combination of the relationships shown in Table 10. For purposes of this table, the radii of curvature of the respective surfaces of each of the lens elements are indicated by the notation $r_1$, $r_2$, etc. As an example, FIG. 10 illustrates the radius of curvature, $r_1$, of surface 1 of lens $L_1$ of FIG. 1. In Table 10, the indices of refraction for the respective lens elements are indicated by the notation $n_{L1}$, $n_{L2}$, etc., and the focal length of the lens assembly is represented by the symbol f.

TABLE 10

Ratios and Relationships For Lens Assembly For f = 10 mm

Radii of Curvature $1000 < r_4/r_2$ or $r_4 = r_2$ = approximately infinity
$-0.56 < r_3/r_9 < -0.81$
$0.9 < r_8/r_9 < 1.1$ or $r_8 = r_9$
$0.9 < r_{10}/r_{11} < 1.1$ or $r_{10} = r_{11}$
Distances/Thicknesses $0.7 < (h_1 + h_2)/(h_3 + h_4) < 1.1$
$0.95 < h_1 + h_2 + h_3 + h_4 + T_1 + T_2 + T_3 + T_4 + T_5 + T_6 < f/1.02$
Indices of Refraction $1.71 < n_{L1}, n_{L2}, n_{L5}, n_{L6} < 1.79$
$1.67 < n_{L3}, n_{L4} < 1.81$ The lens assemblies described herein may be used in various applications and environments. For example, one field of use may be security cameras. Security cameras may be used in banks, casinos, retail stores, personal property, yards, airports, sports and entertainment arenas, theaters, restaurants, cars, office buildings, gas stations, security checkpoints, boarder or other boundary crossings, transportation vehicles and terminals, such as trains and train stations, ships and docks, buses and bus depots, military installations, etc. as the present invention is not limited in this respect.

The lens assemblies described herein may also be used for industrial applications. Examples of this sort of use may include flexible bore scopes with a distal chip, cameras for insertion into wells, cameras for viewing engines (such as aircraft engines) and engine parts, cameras for viewing under buildings or cars, cameras used for measurement, or any other industrial application.

The lens assemblies described herein may also be used for personal or business applications. Examples of this sort may include personal cameras, digital cameras, phone cameras, web cameras, disposable cameras, videography, or any other type of camera or system.

The lens assemblies described herein may also be used for medical applications. For example, the lens assemblies may be used for endoscopy with a distal chip, dental procedures, gynecological exams, ear/nose/throat exams, distal chip colonoscopy, distal chip laproscopy, or any other medical procedures or uses.

Other applications will be readily apparent to those of skill.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Further, although each embodiment described above includes certain features, the invention is not limited in this respect. Thus, one or more of the above-described or other features of the lens assembly, may be employed singularly or in any suitable combination, as the present invention is not limited to a specific embodiment. Accordingly, the foregoing description and drawings are by way of example only.

What is claimed is:

1. A lens assembly for imaging an object, the lens assembly comprising:
a plurality of lenses adapted to provide:
1) a field of view of approximately 40 degrees; and
2) a distortion of less than approximately 1%,
wherein the plurality of lenses is further adapted to provide a ratio of the length of the lens assembly to the back focal length of approximately 1.39.

2. The lens assembly of claim 1, further comprising:
at least one filter plate;
wherein the plurality of lenses is further adapted to produce at least one aberration to compensate an aberration produced by the at least one filter plate.

3. The lens assembly of claim 1, wherein the lens assembly further comprises:
an aperture stop; and
wherein the plurality of lenses is configured symmetrically about the aperture stop.

4. The lens assembly of claim 1, in combination with an imaging device.

5. The lens assembly of claim 4, wherein the imaging device is a security camera.

6. The lens assembly of claim 1, wherein the plurality of lenses comprises:
a first lens group having at least one first lens element, the at least one first lens element having a first surface proximal to the object and a second surface distal to the object; and
a second lens group having at least one second lens element, the at least one second lens element having a first surface proximal to the object and second surface distal to the object.

7. The lens assembly of claim 6, further comprising:
an aperture stop disposed between the first lens group and the second lens group.

8. The lens assembly of claim 7, wherein the aperture stop has a fixed size selectable from a range of aperture stop sizes.

9. The lens assembly of claim 7, wherein the aperture stop is physically contacted by at least one lens of the plurality of lenses.

10. The lens assembly of claim 6, wherein the first and second lens groups are arranged to define a focal length, and wherein a distance between the first surface of the at least one first lens element and the second surface of the at least one second lens element is less than approximately 95% of the focal length.

11. The lens assembly of claim 6, wherein the image of the object is produced on an image plane, the lens assembly further comprising:
at least one filter disposed between the at least one second lens element and the image plane.

12. The lens assembly of claim 11, wherein the at least one filter is a planar filter.

13. The lens assembly of claim 11, wherein the plurality of lenses is further adapted to produce at least one aberration to compensate an aberration produced by the filter.

14. The lens assembly of claim 6, further comprising:
a third lens group having at least one first lens element, the at least one first lens element having a first surface proximal to the object and second surface distal to the object; and
a fourth lens group having at least one second lens element, the at least one second lens element having a first surface proximal to the object and a second surface distal to the object.

15. The lens assembly of claim 14, wherein the first, second, third, and fourth lens groups define a double-Gauss-type lens assembly.

16. The lens assembly of claim 14, further comprising:
an aperture stop, wherein the aperture stop is disposed between the third lens group and the fourth lens group.

17. The lens assembly of claim 16, wherein the third lens group is disposed on a same side relative to the aperture stop as is the first lens group.

18. The lens assembly of claim 17, wherein the third lens group includes a third lens element and a fourth lens element.

19. The lens assembly of claim 18, wherein the third lens element is a positive lens element, and the fourth lens element is a negative lens element.

20. The lens assembly of claim 17, wherein the fourth lens group includes a fifth lens element and a sixth lens element.

21. The lens assembly of claim 20, wherein the fifth lens element is a positive lens element and the sixth lens element is a negative lens element.

22. The lens assembly of claim 21, wherein each of the step locations has a thickness chosen to ensure proper spacing of the plurality of lenses.

23. The lens assembly of claim 1, wherein the lens assembly is housed within a housing having step locations to receive the plurality of lenses.

24. The lens assembly of claim 23, wherein the housing further has an outer surface including flats for affixing a tool thereto.

25. A lens assembly for imaging an object, the lens assembly comprising:
a plurality of lenses adapted to provide:
1) a field of view of approximately 40 degrees; and
2) a distortion of less than approximately 1%
wherein the plurality of lenses is arranged to define a total length, the total length is between approximately 0.95 and approximately 1.02 of the focal length.

26. A lens assembly for imaging an object, the lens assembly comprising:
a plurality of lenses adapted to provide:
1) a field of view of approximately 40 degrees; and
2) a distortion of less than approximately 1%
wherein the plurality of lenses comprises:
a first lens group having at least one first lens element, the at least one first lens element having a first surface proximal to the object and a second surface distal to the object; and
a second lens group having at least one second lens element, the at least one second lens element having a first surface proximal to the object and second surface distal to the object
wherein the first and second lens groups are arranged to define a focal length, and wherein a distance between the first surface of the at least one first lens element and the second surface of the at least one second lens element is less than approximately 95% of the focal length, wherein the total length is between approximately 0.95 and approximately 1.02 of the focal length.

27. A lens assembly for imaging an object, the lens assembly comprising:
a first lens group having at least one first lens element, the at least one first lens element having a first surface proximal to the object and second surface distal to the object;

a second lens group having at least one second lens element, the at least one second lens element having a first surface proximal to the object and second surface distal to the object; and
an aperture stop disposed between the first lens group and the second lens group;
wherein the first and second lens groups are arranged to define a focal length, and wherein a distance between the first surface of the at least one first lens element and the second surface of the at least one second lens element is less than approximately 95% of the focal length, wherein the total length of the lens assembly is between approximately 0.95 and approximately 1.02 of the focal length.

28. The lens assembly of claim 27, further comprising:
a housing having an aperture stop location at a position fixed relative to the housing; and
wherein the aperture stop disposed between the first lens group and the second lens group has an aperture stop size selectable from a plurality of aperture stop sizes, and wherein the aperture stop is disposed at the fixed position of the aperture stop location, independent of the aperture stop size.

29. The lens assembly of claim 27, further comprising:
a third lens group having at least one first lens element, the at least one first lens element having a first surface proximal to the object and second surface distal to the object; and
a fourth lens group having at least one second lens element, the at least one second lens element having a first surface proximal to the object and second surface distal to the object.

30. The lens assembly of claim 29, wherein the aperture stop is disposed between the third lens group and the fourth lens group.

31. The lens assembly of claim 30, wherein the third lens group is disposed on a same side relative to the aperture stop as is the first lens group.

32. The lens assembly of claim 31, wherein the third lens group includes a third lens element and a fourth lens element.

33. The lens assembly of claim 32, wherein the third lens element is a positive lens element, and the fourth lens element is a negative lens element.

34. The lens assembly of claim 31, wherein the fourth lens group includes a fifth lens element and a sixth lens element.

35. The lens assembly of claim 34, wherein the fifth lens element is a positive lens element and the sixth lens element is a negative lens element.

36. The lens assembly of claim 29, wherein the first, second, third, and fourth lens groups define a double-Gauss-type lens.

37. The lens assembly of claim 27, further comprising at least one filter plate disposed between the second lens group and an image plane.

38. The lens assembly of claim 27, further comprising at least one electronic detector disposed at an image plane.

39. The lens assembly of claim 27, in combination with an imaging device.

40. The lens assembly of claim 39, wherein the imaging device is a security camera.

41. A lens assembly for imaging an object, the lens assembly comprising:
a first lens group having at least one first lens element, the at least one first lens element having a first surface proximal to the object and second surface distal to the object;

a second lens group having at least one second lens element, the at least one second lens element having a first surface proximal to the object and second surface distal to the object; and an aperture stop disposed between the first lens group and the second lens group;

wherein the first and second lens groups are arranged to define a focal length, and wherein a distance between the first surface of the at least one first lens element and the second surface of the at least one second lens element is less than approximately 95% of the focal length, wherein the lens assembly further comprises:

a housing having an aperture stop location at a position fixed relative to the housing; and wherein the aperture stop disposed between the first lens group and the second lens group has an aperture stop size selectable from a plurality of aperture stop sizes, and wherein the aperture stop is disposed at the fixed position of the aperture stop location, independent of the aperture stop size.

42. A lens system comprising a plurality of lens elements and an aperture stop, each lens element having a lens surface defined by a radius of curvature (r), a thickness (T), and an index of refraction (n), the plurality of lens elements being spaced from each other by a distance (h), the lens system satisfying at least one of the following conditions:

$1000 < r_4/r_2$ or $r_4 = r_2 =$ approximately infinity;

$-0.56 < r_3/r_9 < -0.81$;

$0.9 < r_8/r_9 < 1.1$ or $r_8 = r_9$;

$0.9 < r_{10}/r_{11} < 1.1$ or $r_{10} = r_{11}$;

$0.7 < (h_1+h_2)/(h_3+h_4) < 1.1$;

$0.95 < h_1+h_2+h_3+h_4++T_1+T_2+T_3+T_4+T_5+T_6 < f/1.02$;

$1.71 < n_{L1}, n_{L2}, n_{L5}, n_{L6} < 1.79$; and $1.67 < n_{L3}, n_{L4} < 1.81$;

where:

$r_2$ represents a radius of curvature of an image side surface of a first lens element;

$r_3$ represents a radius of curvature of an object side surface of a second lens element;

$r_4$ represents a radius of curvature of an image side surface of the second lens element;

$r_8$ represents a radius of curvature of an object side surface of a fifth lens element;

$r_9$ represents a radius of curvature of an image side surface of the fifth lens element;

$r_{10}$ represents a radius of curvature of an object side surface of a sixth lens element;

$r_{11}$ represents a radius of curvature of an image side surface of the sixth lens element;

$h_1$ represents a gap distance between the image side surface of the first lens element to the object side surface of the second lens element;

$h_2$ represents a gap distance between the image side surface of a third lens element to the aperture stop;

$h_3$ represents a gap distance between the aperture stop to an object side surface of a fourth lens element;

$h_4$ represents a gap distance between the image side surface of the fifth lens element to the object side surface of the sixth lens element;

$T_1$ represents a thickness of the first lens element;

$T_2$ represents a thickness of the second lens element;

$T_3$ represents a thickness of the third lens element;

$T_4$ represents a thickness of the fourth lens element;

$T_5$ represents a thickness of the fifth lens element;

$T_6$ represents a thickness of the sixth lens element;

$n_{L1}$ represents an index of refraction of the first lens element;

$n_{L2}$ represents an index of refraction of the second lens element;

$n_{L3}$ represents an index of refraction of the third lens element;

$n_{L4}$ represents an index of refraction of the fourth lens element;

$n_{L5}$ represents an index of refraction of the fifth lens element; and $n_{L6}$ represents an index of refraction of the sixth lens element, wherein the lens system further comprises a focal length of approximately 10 mm.

43. The lens system according to claim 42, the lens system satisfying a plurality of the conditions.

44. A lens system comprising a plurality of lens elements and an aperture stop, each lens element having a lens surface defined by a radius of curvature (r), a thickness (T), and an index of refraction (n), the plurality of lens elements being spaced from each other by a distance (h), the lens system satisfying at least one of the following conditions:

$1000 < r_4/r_2$ or $r_4 = r_2 =$ approximately infinity;

$-0.56 < r_3/r_9 < -0.81$;

$0.9 < r_8/r_9 < 1.1$ or $r_8 = r_9$;

$0.9 < r_{10}/r_{11} < 1.1$ or $r_{10} = r_{11}$;

$0.7 < (h_1+h_2)/(h_3+h_4) < 1.1$;

$0.95 < h_1+h_2+h_3+h_4++T_1+T_2+T_3+T_4+T_5+T_6 < f/1.02$;

$1.71 < n_{L1}, n_{L2}, n_{L5}, n_{L6} < 1.79$; and $1.67 < n_{L3}, n_{L4} < 1.81$;

where:

$r_2$ represents a radius of curvature of an image side surface of a first lens element;

$r_3$ represents a radius of curvature of an object side surface of a second lens element;

$r_4$ represents a radius of curvature of an image side surface of the second lens element;

$r_8$ represents a radius of curvature of an object side surface of a fifth lens element;

$r_9$ represents a radius of curvature of an image side surface of the fifth lens element;

$r_{10}$ represents a radius of curvature of an object side surface of a sixth lens element;

$r_{11}$ represents a radius of curvature of an image side surface of the sixth lens element;

$h_1$ represents a gap distance between the image side surface of the first lens element to the object side surface of the second lens element;

$h_2$ represents a gap distance between the image side surface of a third lens element to the aperture stop;

$h_3$ represents a gap distance between the aperture stop to an object side surface of a fourth lens element;

$h_4$ represents a gap distance between the image side surface of the fifth lens element to the object side surface of the sixth lens element;

$T_1$ represents a thickness of the first lens element;
$T_2$ represents a thickness of the second lens element;
$T_3$ represents a thickness of the third lens element;
$T_4$ represents a thickness of the fourth lens element;
$T_5$ represents a thickness of the fifth lens element;
$T_6$ represents a thickness of the sixth lens element;
$n_{L1}$ represents an index of refraction of the first lens element;
$n_{L2}$ represents an index of refraction of the second lens element;
$n_{L3}$ represents an index of refraction of the third lens element;
$n_{L4}$ represents an index of refraction of the fourth lens element;
$n_{L5}$ represents an index of refraction of the fifth lens element; and
$n_{L6}$ represents an index of refraction of the sixth lens element, in combination with an aperture stop having a size selected from a plurality of aperture stop sizes.

45. The combination according to claim 44, wherein the plurality of aperture stop sizes comprises f11, f8, f5.6, f4, f2.8.

46. A lens system comprising a plurality of lens elements and an aperture stop, each lens element having a lens surface defined by a radius of curvature (r), a thickness (T), and an index of refraction (n), the plurality of lens elements being spaced from each other by a distance (h), the lens system satisfying each of the following conditions:

$$1000 < r_4/r_2 \text{ or } r_4 = r_2 = \text{approximately infinity};$$

$$-0.56 < r_8/r_9 < -0.81;$$

$$0.9 < r_8/r_9 < 1.1 \text{ or } r_8 = r_9;$$

$$0.9 < r_{10}/r_{11} < 1.1 \text{ or } r_{10} = r_{11};$$

$$0.7 < (h_1 + h_2)/(h_3 + h_4) < 1.1;$$

$$0.95 < h_1 + h_2 + h_3 + h_4 + T_1 + T_2 + T_3 + T_4 + T_5 + T_6 \leq f/1.02;$$

$$1.71 < n_{L1}, n_{L2}, n_{L5}, n_{L6} < 1.79; \text{ and}$$

$$1.67 < n_{L3}, n_{L4} < 1.81;$$

where:
$r_2$ represents a radius of curvature of an image side surface of a first lens element;
$r_3$ represents a radius of curvature of an object side surface of a second lens element;
$r_4$ represents a radius of curvature of an image side surface of the second lens element;
$r_8$ represents a radius of curvature of an object side surface of a fifth lens element;
$r_9$ represents a radius of curvature of an image side surface of the fifth lens element;
$r_{10}$ represents a radius of curvature of an object side surface of a sixth lens element;
$r_{11}$ represents a radius of curvature of an image side surface of the sixth lens element;
$h_1$ represents a gap distance between the image side surface of the first lens element to the object side surface of the second lens element;
$h_2$ represents a gap distance between the image side surface of a third lens element to the aperture stop;
$h_3$ represents a gap distance between the aperture stop to an object side surface of a fourth lens element;
$h_4$ represents a gap distance between the image side surface of the fifth lens element to the object side surface of the sixth lens element;
$T_1$ represents a thickness of the first lens element;
$T_2$ represents a thickness of the second lens element;
$T_3$ represents a thickness of the third lens element;
$T_4$ represents a thickness of the fourth lens element;
$T_5$ represents a thickness of the fifth lens element;
$T_6$ represents a thickness of the sixth lens element;
$n_{L1}$ represents an index of refraction of the first lens element;
$n_{L2}$ represents an index of refraction of the second lens element;
$n_{L3}$ represents an index of refraction of the third lens element;
$n_{L4}$ represents an index of refraction of the fourth lens element;
$n_{L5}$ represents an index of refraction of the fifth lens element; and
$n_{L6}$ represents an index of refraction of the sixth lens element.

* * * * *